3,507,931
ISOMERIZATION OF PARAFFINIC HYDROCARBONS IN THE PRESENCE OF A MORDENITE CATALYST

Herbert C. Morris, Wappingers Falls, N.Y., and John P. Shillinglaw, Jr., Rock Hill, S.C., assignors to Texaco Inc., New York, N.Y., a corporation of Delaware
No Drawing. Filed Dec. 22, 1967, Ser. No. 692,661
Int. Cl. C07c 5/30
U.S. Cl. 260—683.65                    10 Claims

ABSTRACT OF THE DISCLOSURE

Paraffinic hydrocarbons containing four to six carbon atoms are isomerized in the presence of a decationized mordenite having a silica to alumina mole ratio greater than about 20:1 and impregnated with a catalyst metal from Group I-B, Group VI-B or Group VIII of the Periodic Table. The isomerization is conducted in the presence of hydrogen at a temperature in the range of 250 to 400° F. which results in high selectivity and substantially reduced cracking.

BACKGROUND OF THE INVENTION

This invention relates to the isomerization of paraffinic hydrocarbons. In one of its more specific aspects, the present invention relates to a process for the hydroisomerization of paraffinic hydrocarbons in the presence of a crystalline alumino-silicate impregnated with a metallic catalyst. It is particularly concerned with the isomerization of $C_4$ to $C_6$ paraffins in the presence of hydrogen and a metal impregnated mordenite catalyst having a silica to alumina mole ratio greater than about 10 to 1.

It has been proposed heretofore to isomerize normal paraffins to equilibrium mixtures of their branched chain isomers with a variety of catalysts. Friedel-Crafts catalysts, such as aluminum chloride, are known to be effective isomerization catalysts. Noble metals, such as platinum, supported on halogenated alumina or silica-alumina have also been used effectively to isomerize hydrocarbons. More recently crystalline alumino-silicate zeolites which have shown catalytic activity have been effectively used in the isomerization of hydrocarbons. Both natural and synthetic crystalline alumino-silicates have been employed. Included among these are the Type X and Type Y zeolites as well as synthetic mordenite.

Although mordenite is usually available as sodium mordenite it must be converted to the hydrogen form to be an effective catalyst. The hydrogen mordenites used heretofore for isomerizing paraffins have been decationized mordenites where the ratio of silica to alumina was about 10:1, substantially the same as in the sodium form of this zeolite.

In general, when specifying the operating temperature for the isomerization of hydrocarbons one skilled in the art is often on the horns of a dilemma. Although low temperatures may produce high equilibrium yields of isoparaffins, the rate of reaction is often too low to be practical. On the other hand higher temperatures, while providing a satisfactory rate of reaction, often produce excess cracking of the feed and a low yield of isoparaffins. With most catalysts a temperature in excess of 400° F. must be employed to achieve a reaction rate sufficient to be commercially attractive although the yield of isoparaffins may not be as high as one would like. Consequently, a catalyst having sufficiently high activity to maintain a high rate of conversion at temperatures below 400° F. would be highly desirable since it would produce a high yield of paraffin isomers.

SUMMARY OF THE INVENTION

We have found that significant improvements are realized in a process for isomerizing light hydrocarbons admixed with hydrogen in the presence of a decationized mordenite catalyst if the ratio of silica to alumina in the mordenite is substantially higher than that in a decationized mordenite whose preparation was limited to the removal of substantially all of the sodium ions. By light paraffinic hydrocarbons, we mean $C_4$, $C_5$ and $C_6$ paraffins and mixtures thereof. By a substantially higher silica to alumina ratio, we mean a ratio greater than about 10 to 1, preferably above about 20 to 1. However, although silica to alumina ratios greater than those previously used in the isomerization of paraffinic hydrocarbons result in an improved isomerization process, the preferred mole ratio is between about 20:1 and 60:1 and little significant improvement is achieved with a mordenite whose silica to alumina mole ratio is greater than about 100:1.

More particularly, we have found that a decationized mordenite, i.e., hydrogen mordenite, having a silica to alumina mole ratio greater than about 10:1 but less than about 100:1, preferably between about 20:1 and about 60:1, impregnated with a metal selected from the groups consisting of Group I-B, Group VI-B and Group VIII of the Periodic Table is an extremely active catalyst for the isomerization of $C_4$ to $C_6$ paraffins. Further, we have found that employing an isomerization temperature of below 400° F. with this catalyst results not only in an extremely high selectivity for paraffinic isomers but also a low yield of cracked products while maintaining a rate of reaction sufficiently high to be commercially attractive. As compared to a decationized mordenite with substantially none of the aluminum removed, i.e., a hydrogen mordenite having a silica to alumina mole ratio of about 10 to 1 the catalyst employed in our invention can catalytically promote an isomerization reaction at a significantly lower temperature. At this lower temperature not only is the conversion of normal paraffins to isoparaffins substantially increased but the lower temperature also reduces the excess cracking often encountered at the higher temperatures which must be employed with the prior art mordenite to increase the reaction rate to a commercially acceptable level.

Hydrocarbon isomers produced from our process are useful as feedstocks for hydrocarbon alkylation processes. Further they find utility as a gasoline blending stock because of their high antiknock properties.

DESCRIPTION OF THE PREFERRED EMBODIMENTS

In accordance with the present invention, a hydrocarbon feedstock containing $C_4$ to $C_6$ normal paraffinic hydrocarbons is contacted with a metal impregnated mordenite-type zeolite in hydrogen form wherein the silica to alumina mole ratio is greater than about 10 to 1 at a temperature effective for conversion of at least part of the paraffins to their branched chain isomers. Since little, if any, improvement has been observed in utilizing a mordenite having an exceptionally high silica to alumina ratio, the practical upper limit for the mordenites useful in the process of our invention are those having silica to alumina mole ratios no greater than 100 to 1.

Feedstocks usefully employed in the process of our invention can be a substantially pure normal paraffin having from 4 to 6 carbon atoms or a mixture of such substantially pure normal paraffins. In addition, hydrocarbon fractions rich in $C_4$–$C_6$ normal paraffins may also be usefully employed. Examples of such useful feedstocks include straight run distillates having ASTM distillation end points of about 170° F. and containing substantial quantities of $C_4$ to $C_6$ paraffins.

The catalyst used in our invention is a particular form of crystalline alumino-silicate known as mordenite. Although mordenite is naturally occurring in the sodium form, synthetic mordenites have become commercially available and are extremely useful in the process of our invention. In its sodium form mordenite usually has minimal catalytic activity and must therefore be converted to the hydrogen or decationized form before it fiinds utility in catalytic processes.

Mordenite structures are characterized by parallel sorption channels of uniform cross-section. The sorption channels are parallel to the C-axis of the crystal and are elliptical in cross-section. The sorption channels dimensions of sodium mordenite, mased on crystallographic studies, have been reported as having a minor diameter of 5.8 to 5.9 A., a major diameter of 7.0-7.1 A. and a free diameter of 6.6 A.; the hydrogen form of mordenite is believed to have somewhat larger pore openings with a minor diameter of not less than about 5.8 A. and a major diameter less than 8 A.

Although mordenite occurs in nature, synthetic mordenites are commercially available from the Norton Company under the trade name Zeolon. These mordenites have a chemical composition, on a unit cell basis, of

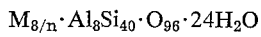
$$M_{8/n} \cdot Al_8Si_{40} \cdot O_{96} \cdot 24H_2O$$

where M may be sodium, hydrogen or some other exchangeable cation and $n$ is the valance of the cation. The high ratio of silica to alumina of 10:1 in the synthetic mordenite permits complete acid exchange to a stable hydrogen form and imparts excellent chemical and thermal stability. The effective working diameter of hydrogen mordenite prepared by acid treating synthetic sodium mordenite and marketed under the trade name Zeolon H appears to be in the range of 8 to 10 A. as indicated by absorption of aromatic hydrocarbons.

The sodium form of mordenite is not effective for isomerization regardless of whether the temperature is within the range ususally employed to effect paraffin isomerization and regardless of catalyst additions. However, the hydrogen form of synthetic mordenite having a sodium content of less than 5 weight percent is exceptionally effective for converting paraffins to their isomers. Decationized mordenite, i.e., mordenite in the hydrogen form, may be produced by ion exchange of the sodium in the mordenite with ammonium ions followed by heating or calcining to drive off ammonia. However, an extremely effective method of producing the decationized mordenite is by acid treatment. In addition to decationizing the mordenite, acid treatment may also remove some of the aluminum from the zeolitic structure, thereby increasing the relative proportions of silica to alumnia in the zeolite. In its sodium form, both natural and synthetic mordenite have a mole ratio of silica to alumina of about 10 to 1. Hydrogen mordenite also has a silica to alumina mole ratio of about 10 to 1 but acid treating the sodium mordenite to produce the decationized form may remove aluminum sufficiently to increase the silica to alumina ratio slightly above 10 to 1. In its decationized form mordenite is an effective catalyst for isomerizing paraffinic hydrocarbons with or without the addition of catalytic metals. We have found, surprisingly, that further acid leaching of a mordenite zeolite in hydrogen form enhances the catalytic activity of the mordenite when employed in a paraffin isomerization process resulting in increased yield of isomers and reduced cracking at temperatures below about 400° F.

The acid leaching used to produce the mordenite catalysts employed in our process must be severe enough to substantially increase the silica to alumina mole ratio of the mordenite to above about 10:1. However, the acid leaching must not be so severe as to destroy the crystalline structure of the mordenite. Further little improvement has been observed in our isomerization process where the silica to alumina ratio of the mordenite is greater than about 100:1. Consequently, as a practical limit the acid leaching should be severe enough to produce a mordenite having a silica to alumina ratio between 10:1 and 100:1, preferably between about 20:1 and 60:1.

Acid leaching may be suitably effected with mineral acids which will selectively remove aluminum without destroying the zeolitic crystalline structure, for example, hydrochloric or sulfuric acid. Boiling dilute hydrochloric acid is extremely effective in removing the aluminum. Following the leaching, the mordenite is water washed and calcined, with or without catalytic metal additions, in air at elevated temperatures up to about 1000° F. Because of this preparation method, the catalysts useful in our invention are referred to hereinafter for convenience as severely acid leached mordenites.

Although we have described an acid leaching technique for preparing the mordenite catalysts used in our process, this has been used for purposes of illustration and not of limitation as there is no intention of excluding any equivalents. Thus, hydrogen mordenites having silica to alumina mole ratios between about 10:1 and about 100:1 prepared by other methods may also be employed in our process.

Structurally mordenite is significantly distinguishable from other zeolites. Mordenite has a chain type zeolite structure in which a number of chains are linked together into a structural pattern with parallel sorption channels similar to a bundle of parallel tubes. In contrast Type A, Type X and Type Y synthetic zeolites and faujasite have three dimensional crystalline cage structures having 4 to 6 windows or pore openings per unit cell through which access may be had to the inner cavity or unit cell of the zeolitic molecular sieve. Although these three dimensional molecular sieves are important catalysts in a number of hydrocarbon reactions, we have found that they are not as effective for the isomerization of paraffinic hydrocarbons as the severely leached mordenite structures used in our process.

In a preferred method of operation hydrocarbon feedstocks containing substantial quantities of $C_4$ to $C_6$ paraffinic hydrocarbons are passed in the presence of hydrogen, into contact with a zeolite of the mordenite type in the hydrogen form and having a silica to alumina ratio between about 10:1 and 100 to 1 under relatively mild hydroconversion reaction conditions. A catalyst metal, suitably a Group I-B, agroup VI-B or a Group VIII metal, particularly a platinum group metal, is preferably associated with the mordenite. The activity of the catalyst is enhanced and its useful life extended by the addition of the metal catalyst, either by impregnation or by ion exchange techniques. Hydrogen, though not necessary for the increased catalytic activity of severely acid leached mordenite for isomerizing paraffinic hydrocarbons, is desirable in that hydrogen extends the life of the catalyst. Hydrogen apparently saturates the free radicals which form within the zeolitic structure thereby preventing the formation of polymeric material which would foul the pore openings. It is also desirable to precondition the catalyst by heating to a temperature in the range of 450 to 1000° F. in hydrogen.

Catalytic additions are generally desirable. Group VIII metals, particularly iron, cobalt, nickel, palladium, platinum and rhodium have been found especially useful catalytic additions to hydrogen mordenite having silica to alumina mole ratios above about 10 to 1. Other metals which are desirable components of the catalyst include such Group I-B metals as silver and copper and the Group VI-B metals, molybdenum, chromium and tungsten. Metals from these three groups may be used alone or in combination. The catalytic metal may be incorporated in or on the mordenite base either by ion exchange or impregnation techniques well known in the art of catalyst manufacture.

Hydrogen mordenite having a silica to alumina mole ratio greater than about 10:1 and containing from 0.1 to 5 percent palladium or platinum by weight, preferably 0.5 to 2.5 percent of either palladium or platinum are effective catalysts for use in the process of our invention. Synthetic mordenite in hydrogen form having a silica to alumina mole ratio between about 10 to 1 and 100 to 1, preferably between about 20 to 1 and about 60 to 1, and having 2 to 2.5 percent by weight palladium incorporated thereon by impregnation has proven to be a very active and rugged catalyst. This particular catalyst is highly resistant to high temperatures permitting regeneration of a catalyst by either oxidation techniques or high temperature hydrogen treatment.

Regeneration of the catalyst by oxidation involves controlled burning of the contaminants from the surface of the catalyst structure with air, or a mixture of inert gases with air or oxygen. Regeneration may also be effected by treatment of the catalyst with hydrogen at temperatures generally above the usual conversion reaction temperature. We have found that palladium on severely acid leached mordenite catalyst structures will withstand high temperatures, e.g., temperatures above 1200° F. and possibly as high as 1500° F., without evidence of damage to the catalyst or deleterious effect on the activity of the catalyst.

In general, preferred operating conditions for paraffinic isomerization as practiced by our invention, i.e., the isomerization of $C_4$ to $C_6$ paraffins in the presence of a hydrogen mordenite having a silica to alumina mole role greater than about 10 to 1 and containing an impregnated catalytic metal thereon are: hydrogen gas in the range of 1000 to 5000 s.c.f./b., preferably 1500 to 2000 s.c.f./b.; space velocities in the range of about 0.1 to 20 liquid volumes per hour per volume of catalyst, preferably 1.0 to 5.0 LHSV; temperatures in the range of about 200 to 650 °F., preferably 250 to 400° F.; and pressures within the range of atmospheric to 3000 p.s.i.g., preferably in the range of 500 to 800 p.s.i.g.

Reaction rates as practiced by the process of our invention are sufficiently high at operating temperatures below 400° F. to be commercially attractive. In fact, to optimize the yield of isomers and minimize the amount of cracked products the temperature should be maintained as far below 400° F. as possible as is consistent with economic operation.

The catalyst may be in the form of granules, e.g., 10 to 25 mesh Tyler Standard Screen Scale, and preferably is in the form of pellets of extrusions having a diameter of about 1/8 inch. The reaction is suitably carried out over a fixed bed of catalyst with the hydrogen and feedstock passing downwardly through the catalyst bed. Unreacted hydrogen may be separated from the effluent stream from the catalyst bed and recycled to the process.

Operating temperature and catalyst activity are correlated with space velocity to give reasonably rapid processing of the feedstock at catalyst deactivation rates which insure maximum on-stream time of the catalyst between periods of regeneration. On-stream time between periods of regeneration usually range from 2 months to 2 years.

As the catalyst ages, its activity for the desired reaction tends to slowly diminish. The catalyst may be maintained at or periodically brought back to approximately its initial level of activity by increasing the operating temperature as the catalyst ages.

The following examples illustrate the practice and advantages of the invention.

EXAMPLE I

This demonstrates the isomerization activity of the severely acid leached mordenite employed in our process.

Hexane isomerization runs were made on a pulse-flow microreactor. The charge was injected in pulses by syringe and passed in the vapor phase into the reactor over the catalyst. The effluent passed into a cold trap sample collector in line with a gas chromatograph. At the end of a run the sample was revaporized and passed into the gas chromatograph for analysis. The fixed bed of catalyst consisted of a hydrogen mordenite having a silica to alumina mole ratio of about 37 to 1 upon which was impregnated 2 weight percent of palladium. The feed was a mixture of normal hexane in a hydrogen carrier gas. Contact times were based on superficial velocity, i.e., volume occupied by catalyst/volume of gas per second. The gaseous mixture of hexane and hydrogen contained 99.4 mole percent hexane. The reactor was operated at 0 p.s.i.g. and 355° F. Three runs were made wherein contact times were 4, 6 and 12 seconds, respectively. The product analysis of the three runs is shown in Table I below.

TABLE I

|  | Contact Time, seconds | | |
|---|---|---|---|
|  | 4 | 6 | 12 |
| Total product analysis, weight percent: | | | |
| Cracked products | 14.0 | 13.0 | 11.1 |
| 2,2-dimethylbutane | 3.3 | 8.3 | 18.9 |
| 2,3-dimethylbutane | 2.5 | 3.8 | 6.7 |
| 2-methylpentane | 24.0 | 38.8 | 35.5 |
| 3-methylpentane | 13.7 | 18.6 | 16.2 |
| n-Hexane | 42.5 | 17.5 | 11.6 |
| Total yield of $C_6$ isomers | 86.0 | 87.0 | 88.9 |

As seen by the increased conversion of hexane to 2,2-dimethylbutane, the most desirable isomer, with increasing contact time, even greater conversion to 2,2-dimethylbutane would be expected at higher contact times.

EXAMPLE II

This example demonstrates the advantage of reducing the operating temperatures to reduce cracking while producing significant quantities of isomers.

Three hexane isomerization runs were made in a manner similar to that of Example I employing the same catalyst and feedstock. In all runs the operating pressure was 0 p.s.i.g. and the contact time was 4 seconds. The reactor temperature was 350, 400 and 450° F., respectively. The product analysis is shown in Table II below.

TABLE II

|  | Temperature, ° F. | | |
|---|---|---|---|
|  | 350 | 400 | 450 |
| Total product analysis, weight percent: | | | |
| Cracked products | 14.0 | 28.8 | 39.3 |
| 2,2-dimethylbutane | 3.3 | 14.2 | 13.5 |
| 2,3-dimethylbutane | 2.5 | 8.1 | 5.4 |
| 2-methylpentane | 24.0 | 22.8 | 22.5 |
| 3-methylpentane | 13.7 | 14.0 | 11.5 |
| n-Hexane | 42.5 | 12.1 | 7.8 |

This demonstrates that at below 400° F. our process produces substantially less cracked products while yielding significant quantities of $C_6$ isomers.

EXAMPLE III

This example demonstrates the advantages of increasing the silica to alumina mole ratio of the hydrogen mordenite above 10 to 1.

This series of runs were conducted in a fashion similar to that of Example I. The same equipment was employed and the feedstock was the same. In the first two runs the catalyst was a hydrogen mordenite having a silica to alumina mole ratio of 37 to 1 upon which was impregnated palladium to the extent of 2 weight percent. In the last two runs the catalyst was a hydrogen mordenite having a silica to alumina mole ratio of 10 to 1 and also impregnated with palladium to the extent of 2 weight percent. The operating conditions and the product analysis of these two parallel runs are shown in Table III below. In each group of runs the contact time was varied.

TABLE III

| | Silica to alumina ratio of catalyst | | | |
|---|---|---|---|---|
| | 37:1 | | 10:1 | |
| Operating conditions: | | | | |
| Pressure, p.s.i.g. | 0 | | 0 | |
| Temperature, °F. | 350 | | 350 | |
| Contact Time, seconds | 4 | 12 | 4 | 12 |
| Product analysis, weight percent: | | | | |
| Cracked products | 14.0 | 11.1 | 25.4 | 43.7 |
| 2,2-dimethylbutane | 3.3 | 18.9 | | |
| 2,3-dimethylbutane | 2.5 | 6.7 | 1.7 | 1.3 |
| 2-methylpentane | 24.0 | 35.5 | 13.3 | 13.6 |
| 3-methylpentane | 13.7 | 16.2 | 7.1 | 5.6 |
| n-Hexane | 42.5 | 11.6 | 52.5 | 35.8 |
| Total yield C₆ isomers, weight percent | 86.0 | 88.9 | 74.6 | 56.3 |

The difference in selectivity is readily apparent as seen by the higher yields as well as the greater conversion of normal hexane to its isomers and 2,2-dimethylbutane, in particular, with the mordenite having the silica to alumina ratio of 37:1 as compared to that having the silica to alumina ratio of 10:1. Further, when the contact time increased there was an increased conversion to $C_6$ isomers with a reduction in cracked products with the severely acid leached mordenite while the runs employing the mordenite with the silica to alumina ratio of 10 to 1 showed a substantial reduction in isomer yield and a large increase in cracked products.

EXAMPLE IV

This example demonstrates that a mixed light paraffin feed may be isomerized by the process of our invention. In a manner similar to that employed in Example I and using the same severely acid leached mordenite impregnated with palladium, a straight run light hydrotreated fraction of $C_4$ to $C_6$ hydrocarbons was fed into the pulse-flow microreactor. The operating conditions and the results are shown in Table IV below.

TABLE IV

| Operating conditions | | Run 1 | Run 2 |
|---|---|---|---|
| Pressure, p.s.i.g. | | 0 | 0 |
| Temp., °F. | | 400 | 450 |
| Contact time, seconds | | 4 | 4 |
| Gas. Chromatograph | Feed | Product, Run 1 | Product, Run 2 |
| Analysis, wt. percent: | | | |
| $C_1$ | | | 2.4 |
| $C_2$ | | 20.8 | 19.5 |
| $C_3$ | | 2.0 | 10.2 |
| Iso-$C_4$ | 0.2 | 3.2 | 9.3 |
| n-$C_4$ | 2.6 | 5.3 | 6.4 |
| Iso-$C_5$ | 19.9 | 26.8 | 26.0 |
| n-$C_5$ | 27.0 | 12.4 | 10.2 |
| 2,2-dimethylbutane | 0.3 | 4.9 | 3.3 |
| Cyclopentane | 0.8 | | |
| 2,3-dimethylbutane | 0.8 | 1.4 | |
| 2-methyopentane | 14.5 | 13.0 | 8.2 |
| 3-methylpentane | 7.5 | 6.4 | 2.9 |
| n-Hexane | 19.7 | 3.8 | 1.6 |
| Methylcyclopentane | 5.3 | | |
| Cyclohexane | 1.0 | | |
| Benzene | 0.4 | | |
| Yield, $C_6$ isomers [1] | 100.0 | 68.3 | 36.8 |

[1] Fraction of $C_6$ isomers in product /fraction of $C_6$ isomers in feed ×100.

These runs show that our process will isomerize a mixed feed to produce a satisfactory yield of branched chain isomers. The results also indicate that higher yields of hexane isomers as well as greater conversion to 2,2-dimethylbutane would be favored by lower temperatures.

The terms and expressions used herein are used as terms of description and not of limitation as there is no intention by the use of such terms and expression of excluding any equivalents as it is recognized that various modifications and departures from the process described above can be made within the scope of the invention claimed.

We claim:

1. A process for isomerizing paraffinic hydrocarbons which comprises contacting said hydrocarbons under isomerizing conditions and in the presence of hydrogen with a catalyst consisting of hydrogen mordenite and a metal selected from the group consisting of Group I-B, Group VI-B and Group VIII, said mordenite having a silica to alumina mole ratio between about 20:1 and about 60:1 and said metal being associated with said mordenite.

2. A process according to claim 1 wherein the hydrocarbons are selected from $C_4$, $C_5$, $C_6$ normal paraffins and mixtures thereof.

3. A process according to claim 2 wherein the hydrocarbon is hexane.

4. A process according to claim 1 wherein the metal is selected from the Group VIII metals consisting of iron, cobalt, nickel, palladium, platinum and rhodium.

5. A process according to claim 4 wherein the metal is palladium.

6. A process according to claim 5 wherein the metal comprises from 0.5 to 5 weight percent of the catalyst.

7. A process for isomerizing a normal paraffin which comprises contacting a hydrocarbon stream comprising normal paraffins selected from $C_4$, $C_5$, $C_6$ normal paraffins and mixtures thereof under isomerizing conditions and in the presence of hydrogen with a catalyst consisting of hydrogen mordenite and a metal selected from the group consisting of Group I-B, VI-B and VIII of the Periodic Table, said mordenite having a silica to alumina mole ratio between about 20:1 and about 60:1, the said metal being associated with said mordenite and comprising 0.5 to 5 weight percent of said catalyst.

8. A process according to claim 7 wherein said isomerizing conditions comprise a temperature in the range of 250 to 400° F., a pressure of 500 to 800 p.s.i.g., a liquid hourly space velocity of 1 to 5 liquid volumes of said hydrocarbon feed per volume of catalyst per hour and hydrogen in the range of 1500 to 2000 standard cubic feet per barrel of hydrocarbon feed.

9. A process according to claim 8 wherein the metal is selected from the group consisting of palladium, platinum and rhodium.

10. A process according to claim 8 wherein the metal is selected for the group consisting of iron cobalt, nickel, silver, copper, molybdenum, chromium and tungsten.

References Cited

UNITED STATES PATENTS

| 3,190,939 | 6/1965 | Benesi | 260—683.65 |
| 3,236,762 | 2/1966 | Rabo et al. | 260—683.65 |
| 3,140,253 | 7/1964 | Plank et al. | 260—683.65 |
| 3,299,153 | 1/1967 | Adams et al. | 260—683.65 |
| 3,370,099 | 2/1968 | Plank et al. | 260—683.65 |

DELBERT E. GANTZ, Primary Examiner

G. J. CRASANAKIS, Assistant Examiner

U.S. Cl. X.R.

252—450, 455